Feb. 8, 1938.   O. A. SCHOITZ   2,107,396
SHAPE CUTTING MACHINE
Filed Feb. 14, 1936    3 Sheets-Sheet 1
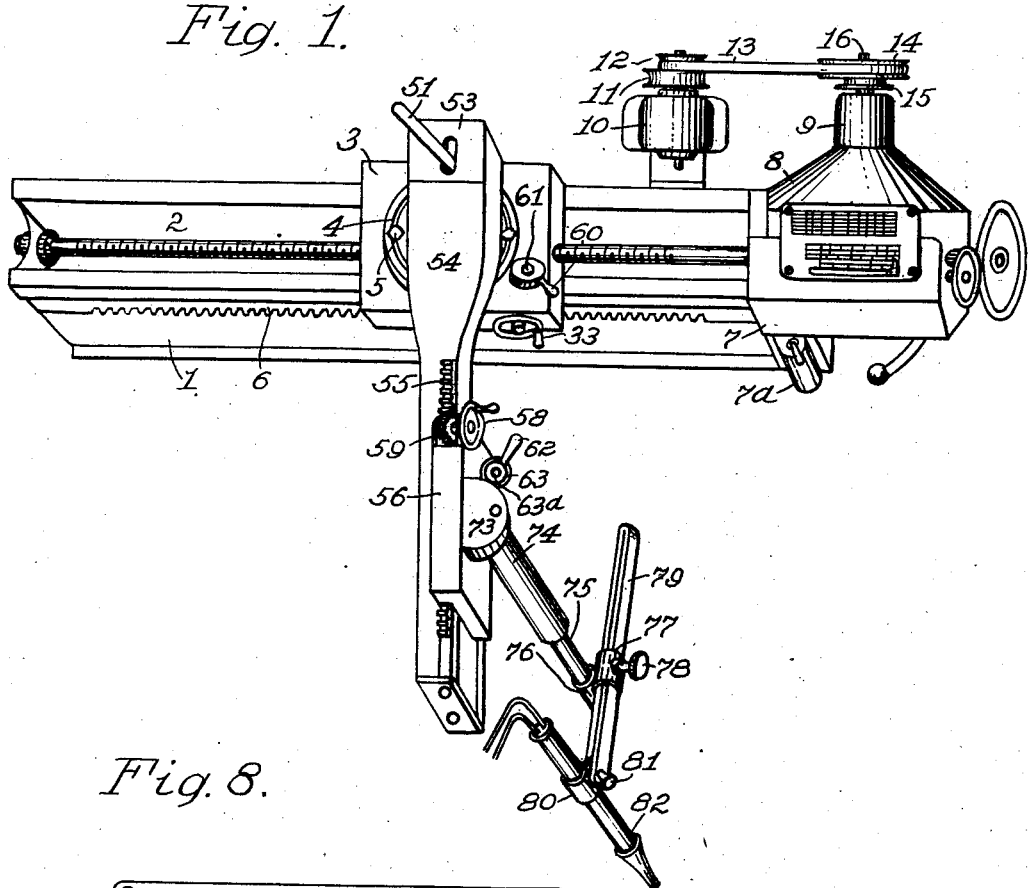
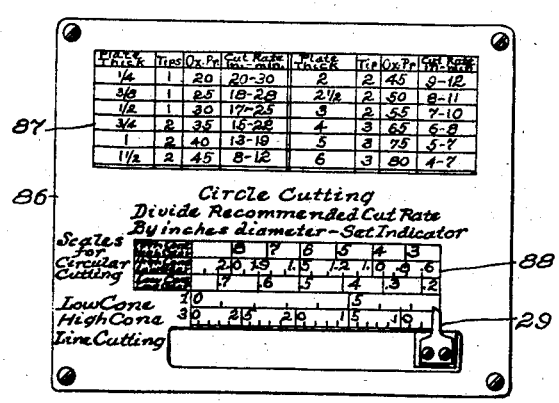
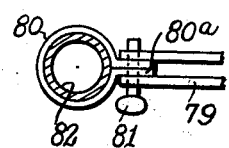
Inventor
Otto A. Schoitz,
Attorney

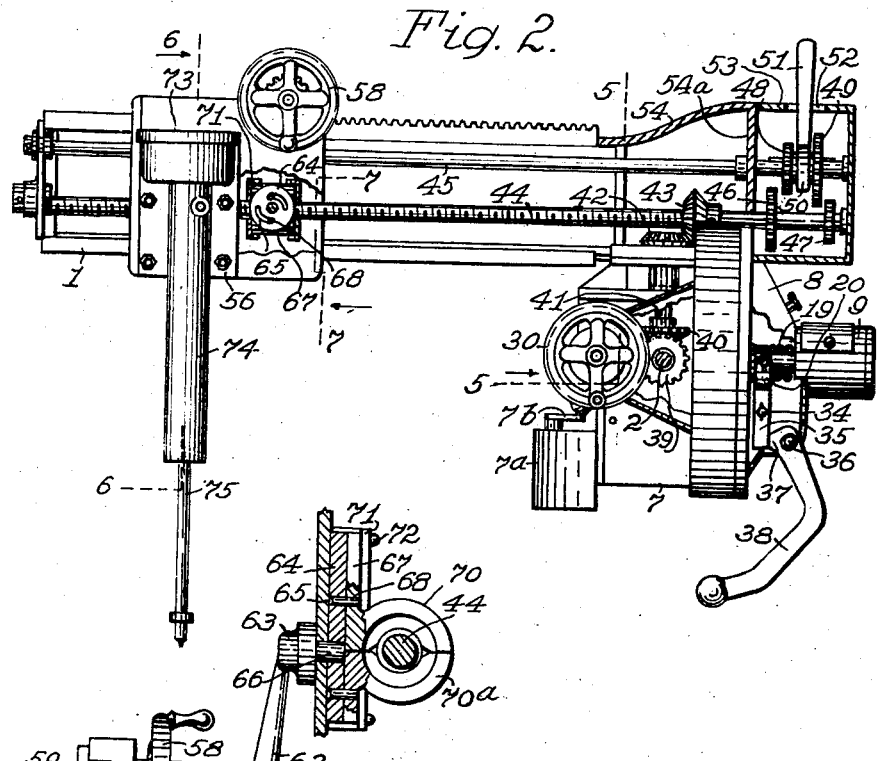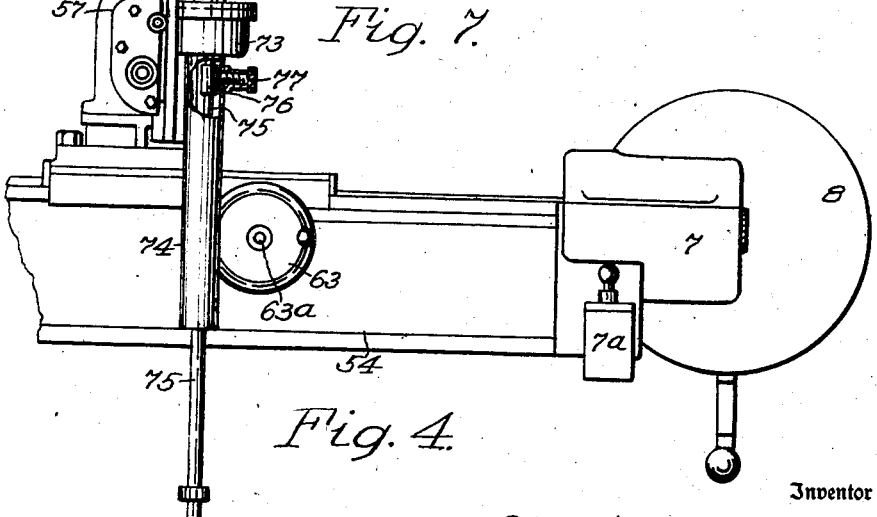

Feb. 8, 1938.   O. A. SCHOITZ   2,107,396
SHAPE CUTTING MACHINE
Filed Feb. 14, 1936   3 Sheets-Sheet 3
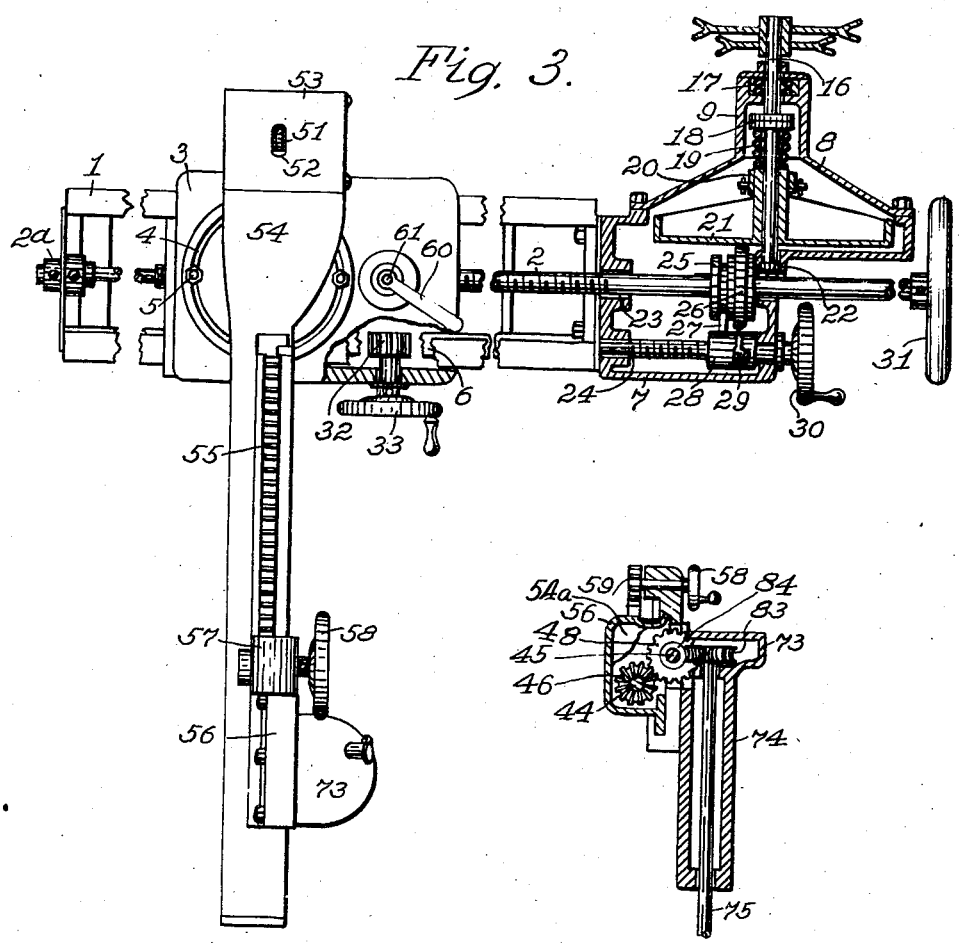
Fig. 3.
Fig. 6.
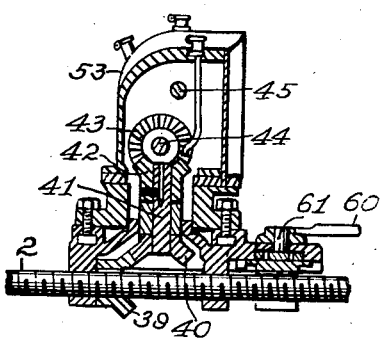
Fig. 5.
Inventor
Otto A. Schoitz.
By G. C. Kennedy
Attorney Patented Feb. 8, 1938

2,107,396

UNITED STATES PATENT OFFICE 2,107,396

SHAPE CUTTING MACHINE

Otto A. Scholtz, Waterloo, Iowa

Application February 14, 1936, Serial No. 63,921

10 Claims. (Cl. 266—23)

My invention relates to improvements in shape cutting machines, and an object of my improvements is to supply a machine suitable and convenient for producing by means of an oxyacetylene torch or its equivalent cuts through sheet metal in thus producing a bounding contour of a desired description to an object by slotting the plate or other primary body operated upon.

Another object of my improvements is to provide coacting mechanisms in the machine, together with an adjustable guiding device, whereby straight line cuts may be made in a desired direction, or containing angles in the directions of the cuts.

Another object of my improvements is to include other means adapted when certain elements are properly related with each other to produce arcuate cuts, or true circular cuts through the material, or also to sever the material along lines partly straight or arcuate in any direction or when including angles.

Another object of my improvements is to associate certain elements of the machine releasably with a power prime mover, and in providing extra elements to coact with the first mentioned elements and adapted to permit the machine to be likewise actuated by manual means.

Another object of my improvements is to so adjustably mount the cutting device relatively to the machine as to cause it to cut a plate not only to produce a desired contour for a production but to produce a beveled edge thereon.

I have accomplished all of these objects by the means and mechanisms in association, and in actual reduction to successful practice, which are hereinafter described, claimed and illustrated in drawings.

Fig. 1 is a perspective view of my improved shape cutting machine.

Fig. 2 is a side elevation of the machine with parts removed, sectioned or broken away.

Fig. 3 is a top plan of the machine with parts sectioned or broken away. Fig. 4 is a side elevation of the torch carrier. Fig. 5 is a section of the intermediate gears, on the broken line 5—5 of Fig. 2. Fig. 6 is a cross section of the torch operating means on the broken line 6—6 of Fig. 2. Fig. 7 is a section across the clamping half-nuts on the line 7—7 of Fig. 2. Fig. 8 is a plan of the line guide plate, and Fig. 9 is an enlarged cross section of the clamping means connecting the blowpipe adjustably to its supporting arm.

Referring to said Fig. 1, the main frame of my machine has cross connected parallel forward and rear walls 1, having an end bearing 2a, and opposite spaced bearings 23 and 22 in an alined casing or housing 7 as a continuation thereof, to receive a main power shaft 2 which is threaded along most of its length. This shaft, as also a longitudinal fixed rack-bar 6, are disposed between the walls 1. Power producing means are provided to rotate the shaft 2, such as an electric or other motor 10, whose shaft carries a pair of differential sheaves 11 and 12 thereon, carrying alternately a driving belt 13 to one or the other differential sheaves 14 or 15 on a rotary shaft 16 which traverses a truncated conical housing 8 and its prolonged central cylindrical extension 9 in a ball bearing 17. The wider end of the housing 8 opens into the casing 7 heretofore mentioned, the latter having a step-bearing to seat the inner end of said shaft 16. Upon the shaft 16 is slidingly mounted a friction disk 21 non-rotatable thereon, and having a hub embraced (see also Fig. 2) by the furcations 20 of an arm 35 and pivoted upon said hub. The arm 35 is medially pivoted on a fixed stem 34, and an operating crank 38 has one end pivoted to the housing 8, traversing an opening therein to project outwardly, the inner extremity of the crank being shaped with a cam part 37 which engages the otherwise free end of said arm 35. A coiled compression spring 19 is seated upon said shaft 16 and engaged between the end of the friction-disk hub and a stop disk device 18 fixed on the shaft 16.

Referring to said Fig. 3, a circular friction disk 26 is mounted on a sleeve 25 slidably non-rotatably seated upon said power shaft 2, and the sleeve 25 has an annular bearing trough therearound to admit an end of a fixed pin 27 on a screw-sleeve 28 mounted on a short threaded shaft 24 whose extremities are seated in opposite bearings of the housing 7, with one end of the shaft projecting and carrying a hand-wheel 30. A stud with terminal index finger 29 is fixed on the sleeve 28, and, as shown in Fig. 8, this stud and index 29 are placed with the stud traversing an opening (not shown) in the housing 7, with the index 29 above the guide-plate 86 secured on the housing 7, so that the index may point to any of graduations 88, near a table 87.

When the cam 37 engages the forked arm 35 as shown in Fig. 2, the spring 19 is compressed with the disk 21 disengaged from the disk or friction roller 26, and the shaft 2 not driven. When the crank 38 is swung back oppositely the spring 19 reacts to reengage the disk 21 with the roller 26, to rotate the shaft 2. A reversing device in a box 7a may be operated by a crank handle 7b, in reversing the motor 10 by means well known, but not shown, in reversing the rotation of the shaft 2. When the friction disks are not in contact, the shaft 2 may be rotated by use of a hand-wheel 31 thereon. It will be seen that the speed of rotation of the shaft 2 may be varied in a well known manner by using the hand-wheel 30 to rotate its shaft 24 to shift the screw-sleeve 28 to and fro on the shaft 2 when the friction disks are in contact.

A carriage 3 is traversed by the shaft 2, the latter shifting the carriage to and fro longitudinally when the reversing device is used to return the carriage. An elongated arm or housing member 54, having a partition 54a providing an end chamber 53, is mounted to swing upon the carriage 3 by a pin and slot connection 5 and 4 therewith and to project forwardly from the carriage. A pair of half-nuts are mounted on the shaft 2 in mesh therewith when the shaft is being rotated by the power motor 10 to shift the carriage 2 and its movable arm along the frame 1 longitudinally. When it is desired to shift the carriage 2 manually, the half-nuts may be thrown out of mesh with the thread of the shaft 2 by use of the shaft 61 and rock-handle 60 and other elements like those shown in Figs. 2 and 7 to be described specifically later. Then the carriage 3 may be shifted by the use of a hand-wheel 33 (Fig. 3) mounted in the carriage 3 and having a gear 32 always meshing with the rack 6.

The arm 54 has a longitudinal rack 55 on its top engageable by a pinion 59 having a hand-wheel 58 mounted on a carrier frame 56 mounted for movement longitudinally on said arm. As shown in Fig. 2, the frame 56 has a bracketed and communicating chamber 73 thereon, also shown in more detail in Fig. 6, and carrying a depending tubular member 74.

As shown in Fig. 6, a worm gear 83 is mounted in the chamber 73 and has a depending shaft 75 traversing it and extending below it. As shown in Fig. 4, a bifurcated friction member 76 in the member 74 frictionally embraces the shaft 75 and has a socket part with a threaded screw 77 engaging it for thrusting it into contact with the shaft to tend to take up for vibration or jar of the shaft 75 which latter supports adjustably a holder 79 for an oxyacetylene torch 82 or other cutting or delineating appliance. This means includes a double socket clamp device 76—77, with clamping screws as at 78, one socket embracing the member 75 and the other removably and adjustably clamping the parts of an arm 79. This split arm at one end embraces the outwardly directed pair of lugs 80a on a clamping sleeve 80 which adjustably embraces the body of the torch 82.

The arm member 54 is longitudinally traversed by rotary shafts 44 and 45. In the end chamber 53 of said arm 54 the shaft 44 carries a spaced pair of spur gears 46 and 47 of different diameters, and the shaft 45 carries slidably thereon a sleeve 50 having a handle 51 forked and projecting through a slot 52 in the chamber 53, the fork embracing the sleeve loosely, and the sleeve having the pair of end pinions 48 and 49 thereon of different diameters to have them moved into mesh alternately with the gears 46 and 47. The shaft 44 is driven as shown in Fig. 2 by a set of gears, one being a bevel gear 43 fixed on said shaft 44 and in mesh with a bevel gear 42 on a short shaft 41 which carries a bevel gear 40 in mesh with another bevel gear 39 on the power shaft 2. When the handle 51 is shifted either way, the shaft 45 is rotated at a speed varying according to which ones of the pairs of gears on the shafts 44 and 45 are engaged. The set of bevel gears above described is also shown in Fig. 5 in cross section except the gear 43. Also in Fig. 5 is a sectional view of the half-nut device 60 and 61 indicated in part in Fig. 1.

Referring now to said Fig. 6, there is mounted on the shaft 45 a worm thread 84 which meshes with the said worm wheel 83. By this means the spindle shaft 75 is rotated together with the torch 82 (see Fig. 1), the torch being on the arm 79 at an adjusted distance from the shaft 75 is thus swung to act upon a plate supported beneath to fuse and cut through the plate in a circular arc or a complete circle in thus shaping the desired portion in part or all around, with a desired radius of curvature and length. As the torch 82 is supported hingedly in the clamp 80 adjustably relatively to the arm 79, it may be adjusted inclinedly to cut the plate with a bevel edge of a desired angularity.

Referring to Fig. 7, a half nut assemblage as shown in Fig. 2, and as indicated in said Figs. 1 and 3 in part, may be used in mesh with the shaft 44 when the machine is driven by a prime motor as at 10, but when it is desired to drive the machine manually, the nut halves 70 and 70a are separated and out of mesh with the shaft 44 by the following means. By means of screws 72, inwardly spaced, the facing gibs 71 are secured to the wall of the carrier 56. These gibs clamp between them and their inner flanges a circular plate or disk 64. Outside the carrier 56 a hub 63 with a handle 62 has a short shaft 66 traversing a bearing in the wall of the carrier 56 and the disk 64 is fixed on its inner end. As shown in Fig. 2, the disk 64 has opposite eccentrically positioned arcuate slots 65 into which extend pins 68 fixed on the abutted portions 67 or shanks of the half-nuts 70 and 70a. When the hub 63 is rocked in one direction to unmesh the half-nuts 70 and 70a from the shaft 44, to permit of manual rotation of said shaft when the friction disks 21 and 26 are separated, and the first-mentioned half-nuts are unmeshed from the shaft 2, the hand-wheel 31 may be employed for manual operation of the entire machine. As shown in Fig. 7, a handled wheel 63 with handle 63a may be used to actuate the half-nuts 70 and 70a. The eccentric slots 65 and pins 68 therein thus cause the half-nuts to move to and from the shaft 44, or in a like way to actuate the half-nuts indicated in Fig. 3 at 61.

It will be seen that to cause the torch 82 to cut in a straight line through a plate supported beneath it, by either prime motor 10 or by manual power, the hand-wheel 30, when the friction disks are engaged and driven by a motor 10, or when the shaft 2 is to be not rotated manually, is used to position the annular disk 26 at a distance radially from the shaft 18 sufficient to produce the required speed of rotation of the shaft 2. The half-nuts at 60—61 being engaged with the shaft 2 the carriages 3 with the arm 56 are moved in parallel with the frame 1, and the torch is likewise carried in a direction parallel with the frame. When the friction disks are disengaged, also the half-nuts at 60—61 disengaged from the shaft 2, the like result of the torch cutting in a straight line or parallel to the frame 1 is achieved, by using the hand-wheel 31.

To cut the plate at an angle to the frame 1, the shaft 2 rotating by either power or hand means, the miter gear 39 having a sliding fit on the shaft 2 is rotated together with the gearing shown in Fig. 5 to rotate the shaft 44 at the same speed as all these gears are of the same size. The half-nuts 70—70a being meshed with the shaft 44, the carrier 56 is moved out along the track 55 carrying the torch 82 at an angle to its parallel course longitudinally relative to the frame 1. When the half-nuts 70—70a are disengaged, the carrier 56 may be likewise shifted along the arm 54 by use of the hand-wheel 58. The arm 54 being mounted to swing on the member 3 by the pin or bolt connections 5 traveling in the circular slot 4, the arm may be positioned at any oblique angle to the member 3, so that the torch 82 has its direction of cut likewise directed, to be oblique or to change the direction of cut from longitudinal direction to an oblique direction relative to the frame 1.

To cause the torch 82 to perform arcuate or circular cutting, and referring to Figs. 2 and 6, the arm or lever 51 may be used to engage the gears 48 and 46, rotation being thus imparted from the shaft 44 to the shaft 45, worm gearing 84 and 83, shaft 75 and the torch 82 (see Fig. 1), thus swinging the torch 82 arcuately or circularly to cut in a plate in an arc or circle.

It will be seen, that the torch 82 may be adjustably shifted along the arm 79 to afford a desired radius of arcuate or circular cut within the scope of said arm, and that also the torch may be swung on the arm 79 inclinedly to a desired angle to permit the torch while cutting a plate to give the plate a beveled edge of the required slope.

It is to be understood that mechanical equivalents may be employed in any of the sub-combinations of elements of my invention, and that the same are covered by my appended claims.

I claim:

1. In a shaping machine of the character described, an elongated track, a carriage movable to and fro thereon, an arm having an end positioned upon and supported movably on said carriage to be swung to and fro in one plane parallel with said track and having a rack extending longitudinally therealong, a carrier chamber alongside said arm, an adjusting gear-wheel mounted on said chamber and meshed with said rack to travel with the frame therealong, a casing on and in communication with said chamber, a rotatable spindle mounted in said casing, a braking device mounted on and in the casing to releasably engage and hold the spindle against rotation, means for rotating said spindle mounted on said arm and within said chamber and casing, and a cutting device mounted releasably and adjustably on the spindle for various angular adjustments relative thereto and for spacing it apart from the spindle and securing it in adjusted positions relative thereto in spacing it bodily away therefrom.

2. In a shaping machine of the character described, an elongated basal support having in parallelism therealong a rack, a carriage movable to and fro relative to and above said rack, a manually rotatable gear-wheel seated on the carriage and in mesh with said rack, a threaded shaft seated rotatably across and engaging said carriage, means for rotating said shaft in either of opposite directions, an arm positioned on and to project from said carriage to swing in one plane relative thereto, said arm having a rack therealong, a carrier chamber adjacent said arm and adjustably movable therealong, a torch burner, means for movably supporting said burner removably and adjustably on said chamber, means operatively engaged between said burner, said arm, said carriage and the means for rotating said shaft, for propelling the burner along desired lines of use, and means for varying the speed of rotation of said shaft.

3. In the combination device of said claim 2, power-driven means, and a make and break connection between said power-driven means and said threaded shaft.

4. In a shape cutting machine, in combination, a basal support, a carriage movable to and fro thereon, an arm member terminally bracketed on the carriage swingably and for to and fro movements thereon, a tool mounted swingably on the arm member, adjustably tiltable, slidably adjustable relative thereto and for up and down changes of position, means for releasably securing the tool in said adjusted positions, and power driven mechanism including variable speed devices mounted on said basal support, carriage and arm member in disconnectible associated connections with said tool as adjusted for moving said tool, whereby materials may be operated upon with uninterrupted changes of position of the tool as adjusted, straight, angular or curvate.

5. In a shape cutting machine, in combination, a frame, a threaded operating shaft mounted therein, single power means for rotating said shaft at different speeds, a carriage operatively engaged with said shaft to move to and fro therealong, an arm mounted on said carriage to swing in a plane, a blowpipe supporter adjustably movable in one plane along said arm, a threaded shaft mounted on said arm for shifting said supporter in one plane, single speed changing gearing disassociably connected between said shafts, a blowpipe or the like supported on said supporter adjustably for employment in different planes, a guiding tablet and an index member movable thereover and included in said power means for variably changing the speed of rotation of the first mentioned shaft.

6. In a shape cutting machine, in combination, a single prime mover, a single friction disk rotated thereby, a friction roller engaging said disk and movable radially thereacross, a threaded shaft on which said roller is splined and slidable, a speed-changing arm operatively connected with said roller, a frame upon which said prime mover, friction members and shaft are mounted, a carriage movable to and fro longitudinally on said frame, an arm mounted swingably in one plane on said carriage to extend therefrom angularly, a supporter mounted for to and fro translation along said arm, disconnectible interacting driving means between said shaft, carriage, arm and supporter, and a blowpipe supported movably on said supporter for adjustments, and connected to said supporter, said blowpipe adapted to be shifted relative to said carriage, arm and supporter for causing the blowpipe to cut in a body variously directed lines of cutting in a plane to a desired contour, or in differently inclined planes to produce a beveled edge of a desired angle of obliquity.

7. In a shape cutting machine, in combination, a frame, a threaded operating shaft mounted therein, single means for rotating said shaft at different speeds, a carriage operatively engaged with said shaft to move to and fro therealong, an arm mounted on said carriage to swing in a plane, a tool supporter movable in one plane along said arm, a threaded shaft mounted on said arm for shifting said supporter in one plane, single speed changing gearing disassociably connected between said shafts, a cutting tool supported on said supporter adjustably for employment in different planes, a guiding tablet, an index member movable thereover and manually operable means for shifting the index member across the tablet and loosely engaged with the speed changing gearing, for changing the speed of rotation of the first mentioned shaft.

8. In a shape cutting machine, in combination, a basal support, a carriage movable to and fro thereon, an arm member terminally bracketed on the carriage swingably and for to and fro movements thereon, a tool mounted swingably on the arm member, adjustably tiltable, slidably adjustable relative thereto and for up and down changes of position, means for releasably securing the tool in said adjusted positions, power driven mechanism including devices mounted on said basal support, carriage and arm member in disconnectible associated connections with said tool as adjusted, for moving the tool, whereby materials may be operated upon with uninterrupted changes of position of the tool, as adjusted, whether in lines straight, angular, curvate, or any combination thereof, a motor for driving the power driven mechanism, an axially adjustable resiliently controlled friction disk driven thereby, the power driven mechanism including a rotatable power shaft, a friction-wheel mounted slidably thereon non-rotatably and normally contacting with the friction-disk, a threaded counter-shaft adjacent to the power-shaft, manually operable means for rotating the counter-shaft, the friction-wheel having a hub provided with a circumferential groove, a nut mounted on the threaded part of the counter-shaft and having a radial pin seated in said groove, an indicator finger on said nut, and a graduated scale traversed by said finger when said nut and friction-wheel are shifted to and fro radially across the friction-disk.

9. In a shape cutting machine, in combination, a basal frame, a rotatable threaded shaft mounted upon said frame, means for manually rotating said shaft, a carriage mounted for to and fro movements along said frame, a pair of mated separably assembled half-nuts mounted on said frame for to and fro movements and having interior threading to fit removably on the thread of said shaft, manually operable means loosely connected to said half-nuts and adapted to be shifted to place them in mesh with or out of mesh with said shaft, an arm pivotally mounted at one end on said carriage, a threaded shaft rotatably mounted along said arm, operative connections between said threaded shafts including manually operable make and break means therefor, a chamber mounted for to and fro movements along said arm, a second pair of mated separably assembled half-nuts mounted on said chamber for to and fro movements and having interior threading to fit removably on the thread of said arm shaft, manually operable means loosely connected to said last-mentioned half-nuts and adapted to be shifted to place them in mesh with the thread of the arm shaft or out of mesh therewith, a tool device mounted movably on said chamber, operative connections between said tool device, said arm shaft, last-mentioned half-nuts and said frame shaft, a manually operable gear mounted on said chamber engaging said rack for to and fro translations of the chamber along said arm, a rack on the basal frame and a manually operable gear mounted on said carriage for to and fro translations of the carriage along said frame.

10. In a shaping machine of the character described, a basal support having a fixed rack extended therealong, a carriage movably mounted on said support, a manually rotatable gear-wheel mounted on the carriage and meshed with the teeth of said rack, an arm having one end positioned upon said carriage for rocking movements thereon, and including a rack therealong, a carrier chamber adjacent said arm to move longitudinally therealong, a gear-wheel mounted on said chamber and in mesh with the second rack, a casing rigid with said chamber, communicating therewith and having a spindle-bearing, a spindle mounted in said bearing, meshed gearing means in said chamber and casing for rotating said spindle, braking means movably mounted on the casing for releasably engaging the spindle, means mounted on said arm and carriage for shifting the said carrier chamber to and fro along the arm, power means, a threaded shaft mounted rotatably on said basal support, said power means being operatively engaged and associated with said shaft to rotate it and at various speeds of rotation, said power-shaft being releasably connected to said carriage, a rotatable shaft mounted longitudinally along said arm and seated in said chamber to shift the chamber to and fro along said arm, clash-gearing on said arm, a manually controllable gearing pair intermediate the clash-gearing to mate with the same alternately to vary the speed of rotation of the rotatable shaft on said arm, a cutting device, and lockably jointed members connected for relative adjustments between said spindle and said cutting device.

OTTO A. SCHOITZ.